United States Patent [19]

Baker et al.

[11] Patent Number: 4,772,391
[45] Date of Patent: Sep. 20, 1988

[54] COMPOSITE MEMBRANE FOR REVERSE OSMOSIS

[75] Inventors: Richard W. Baker, Palo Alto, Calif.; Robert P. Barss, Bend, Oreg.

[73] Assignee: The United States of America as represented by the Secretary of the Interior, Washington, D.C.

[21] Appl. No.: 877,890

[22] Filed: Jun. 24, 1986

Related U.S. Application Data

[63] Continuation-in-part of Ser. No. 702,421, Feb. 13, 1985, abandoned, which is a continuation-in-part of Ser. No. 447,951, Dec. 8, 1982, abandoned, which is a continuation-in-part of Ser. No. 259,349, May 1, 1981, abandoned.

[30] Foreign Application Priority Data

May 1, 1980 [CA] Canada .................................. 351050

[51] Int. Cl.$^4$ .............................................. B01D 13/00
[52] U.S. Cl. ............................. 210/490; 210/500.23; 264/41
[58] Field of Search ........... 210/654, 490, 491, 500.23, 210/500.36; 264/41, 49

[56] References Cited

U.S. PATENT DOCUMENTS

| | | | |
|---|---|---|---|
| 3,615,024 | 10/1971 | Michaels | 210/500.42 X |
| 3,691,068 | 9/1972 | Cross | 210/500.23 X |
| 4,039,440 | 8/1977 | Cadotte | 210/500.36 X |
| 4,230,463 | 10/1980 | Henus et al. | 210/500.23 X |

Primary Examiner—Frank Spear
Attorney, Agent, or Firm—Chernoff, Vilhauer, McClung & Stenzel

[57] ABSTRACT

A composite lumen-side feed reverse osmosis membrane and its preparation are disclosed, the membrane comprising a polymeric microporous-walled hollow fiber support with an interfacially-polymerized ultrathin semipermeable salt-rejecting layer engrafted on the lumen or bore of the hollow fiber support, the support having walls that are substantially completely free of finger-like voids in excess of about 5 microns in the area of the wall adjacent the lumen. The preparation of the support comprises coaxially spin-casting (1) a fiber-forming solution containing a pore-forming material with (2) a lumen-forming fluid comprising from about 50 to about 70 vol % organic solvent in water.

20 Claims, 1 Drawing Sheet

COMPOSITE MEMBRANE FOR REVERSE OSMOSIS

The Government has certain rights in this invention under Contract Nos. 14-34-0001-1449, 14-34-001-2421, 14-34-001-2982 and 14-34-001-7552 awarded by the Office of Water Research and Technology.

This application is a continuation-in-part of U.S. Ser. No. 702,421, filed Feb. 13, 1985, which was a continuation-in-part of U.S. Ser. No. 447,951, filed Dec. 8, 1982, which in turn was a continuation of U.S. Ser. No. 259,349, filed May 1, 1981, all three prior applications now abandoned.

BACKGROUND OF THE INVENTION

This invention relates to reverse osmosis membranes, their preparation, and their use in processes for desalination of water.

Reverse osmosis is an established process for removing various dissolved salts from water. In such a process, a pressure which exceeds the osmotic pressure of the feed solution is applied to a saline water feed solution separated from purified water by a semipermeable membrane. As a result, water diffuses through the membrane with most salt molecules being rejected by the membrane to remain in the saline feed solution.

While desalination by reverse osmosis is known, certain drawbacks attending practice of the process using known equipment and materials have tended to limit its acceptance. For example, when practicing reverse osmosis utilizing a sheet-like membrane to separate the feed solution from the purified water, the sheet configuration of the membrane severely limits the available membrane surface area. It is recognizd that a membrane may be formed as a bundle of hollow fibers, this being effective to substantially increase the membrane surface area. However, for a number of reasons, the use of such hollow fibers in reverse osmosis desaliniation has not been entirely successful.

A hollow fiber bundle ordinarily is utilized in reverse osmosis desalination with the feed directed against the shell or outer sides of the fibers. This is done because a hollow fiber, subjected to a difference in fluid pressure on opposite sides of the wall of the fiber, is better able to withstand the pressure differential without rupturing when the elevated pressure is exerted on the outside of the fiber to exert radially inwardly directed forces, rather than on the inside of the fiber to exert radially outwardly directed forces. However, concentration polarization and fouling are severe problems in systems which rely on such shell side feed. The usual brackish water includes, in addition to dissolved salt, suspended solid particulate material. With shell side feed systems utilizing relatively low flow rates of feed solution, stagnant areas or "dead" spots within the fiber bundle result in collection of such material on the membrane surface to reduce its efficiency. In addition, salt concentration tends to build up in stagnant areas, thereby producing concentration polarization which further decreases efficiency.

Tubes have been suggested for use in membrane systems with the feed solution being pumped through the lumens or bores of the tubes. For instance, microporous polyvinyl chloride tubes have been proposed as the support for a reverse osmosis membrane. These tubes are prepared by melt extrusion of a mixture of polyvinyl chloride and micronized sodium chloride. After cooling, the sodium chloride is leached from the support to form the pores in the structure. Such tubes have a high burst pressure and are good supports for cellulose acetate membranes prepared by the Loeb-Sourirajan technique. However, a cellulose acetate membrane so prepared is characterized by a low flux or flow rate and inferior rejection of salt. Moreover, these tubes are too expensive to be widely used.

In NTIS Report No. PB-248 666 (1975), Cabasso et al. studied the development of outside-skinned coated hollow polysulfone fibers for reverse osmosis desalination of seawater, disclosing hollow fiber spinning of polysulfone with various additives, including methyl Cellosolve ® (MeC), fatty acids, PVP, and polyethylene glycol (PEG). Satisfactory spinning solutions were prepared containing 10% PVP, 10% MeC and 10% PEG, the PEG fibers failing under pressure applied to the outside of the fibers. However, no consideration was given to or determination made as to coating with an ultrathin solute barrier membrane on the inside or lumens of the fiber.

U.S. Pat. No. 4,051,300 to Klein et al. discloses porous hollow fibers for use in separation schemes such as reverse osmosis, ultrafiltration and gas separations. These fibers are said to be designed so that ultrathin solute barrier coatings can be supported on either their external or internal surfaces, and so that a solvent containing dissolved solute, under pressure, will first contact the ultrathin solute barrier coating, with the solvent then passing through the hollow porous fiber, leaving the solute behind. The porous support fibers disclosed in the Klein et al. patent are prepared by hollow fiber spinning an organic solution containing a fiber-forming polymer (polysulfones and aromatic polyamide polymers are disclosed) together with polyvinylpyrrolidone (PVP) as a pore-forming material. However, such supports do not possess the proper combination of the properties of sufficient burst strength, water permeability and coatability to meet the requirements of successful lumen-side feed reverse osmosis operation.

SUMMARY OF THE INVENTION

This invention provides an improved reverse osmosis composite membrane comprising a microporous-walled hollow fiber support, prepared from a fiber-forming polymer, certain nonpolymeric liquid pore-forming materials, and certain lumen-forming solutions, the support having a salt-rejecting film or layer on the inner surface or bore which defines the lumen in the fiber. The support fibers themselves, before adding the inner salt-rejecting film or layer, have strength to withstand the internal pressures required for successful reverse osmosis applications with the feed solution delivered to the fiber lumen, as well as possessing the characteristics peculiar to and necessary for satisfactory coatability of the lumen surface thereof with a salt-rejeting membrane.

The composite membranes of the present invention may be prepared by formation, by interfacial polymerization, of a thin, salt-rejecting semipermeable film or layer on the inner lumen-defining surface or bore of the microporous-walled hollow fiber support. Such composite membranes have been found capable of withstanding internal burst pressures of up to 1300 psig, providing flux of up to 50 gallons per square foot per day (gfd) at 800–1000 psig operating pressure, while at the same time providing NaCl salt rejection of up to 99.5%.

The effectiveness, particularly as to salt rejection, of such composite membranes in reverse osmosis processes is highly dependent on the specific nature of the porous hollow fiber support. Specifically, these hollow fiber supports are characterized by the presence of a multiplicity of elongated, often teardrop-shaped, radially extending microvoids or "fingers" of lengths ranging from about 5 to 100 microns or more, the "fingers" often projecting very near to the surface of the lumens or bore of the hollow fiber supports. It is believed that the expansion occurring in conventional hollow fibers when fluid under pressure is introduced to the lumens thereof causes such voids to open up, thereby stretching and rupturing the semipermeable salt-rejecting film, resulting in low salt rejection and ultimately, loss of the film.

Accordingly, it has been found that composite membranes employing the microporous-walled hollow fiber supports of the present invention, the supports of which are substantially completely free of such elongated voids in the area of the walls of the fibers that is immediately adjacent the lumens of the hollow fiber supports generally exhibit excellent salt rejection as illustrated in the examples below. We have further found such microporous-walled hollow fiber supports, i.e., ones substantially completely free of such elongated voids adjacent the lumens, may be prepared using conventional hollow fiber spinning apparatus, provided the correct spinning solution compositions, containing certain nonpolymeric liquid pore-forming materials, and further provided that certain lumen-forming solutions, are used, as more fully described below.

It has further been found that the microporous-walled hollow fiber support of the present invention should have a generally finely porous internal surface to facilitate application of the salt-rejecting film, the pores thereof being less than 0.01 micron in diameter and exhibiting a hill-and-valley deviation of no more than about 30 microns. At the same time, the wall of the hollow fiber should be sufficiently porous to offer only minor resistance to the flow of water through the wall. In general, porosity should be sufficient to provide a water flux of at least 5 gfd at 400 psig, with a preferred flux of at least 25 gfd at 400 psig.

The microporous-walled hollow fiber support of the present invention should be able to withstand significant internal pressures without bursting or creeping. Fibers prepared as described herein are generally capable of withstanding burst pressures of at least 800 psig, thus enabling safe operation in reverse osmosis processes at pressures of between 800–1000 psig. The support fiber will generally have an inside diameter of about 125 to 1250 microns, preferably in excess of 250 microns. Fibers with internal diameters of less than 125 microns require large pressures to circulate feed solution through their interiors. Inside diameters of about 125 to 1250 microns provide a suitably large membrane surface area, while allowing ready application of the salt-rejecting film to the inner surface of the fiber. The wall of the support fiber will ordinarily have a thickness of about 90 to 400 microns and is substantially completely free of microvoids having lengths in excess of about 5 microns in the area of the wall adjacent the lumen surface. By "adjacent" is meant within approximately the first one-third of the wall's thickness measuring from the lumen-defining surface radially outwardly.

The foregoing and other objectives, features and advantages of the present invention will be more readily understood upon consideration of the following detailed description of the invention taken in conjunction with the accompanying drawings.

DETAILED DESCRIPTION OF THE INVENTION

Microporous-walled hollow support fibers suitable for use in the composite membranes of this invention are conveniently prepared using a tube-in-orifice solution spinning technique, fibers so prepared being referred to as hollow spun fibers. A fiber spinning aparatus suitable for preparation of such fibers is illustrated schematically in FIG. 1, and in FIG. 2 there is shown, on a larger scale and in an exploded view, a spinnerette which is part of the apparatus shown in FIG. 1.

Figure 1:
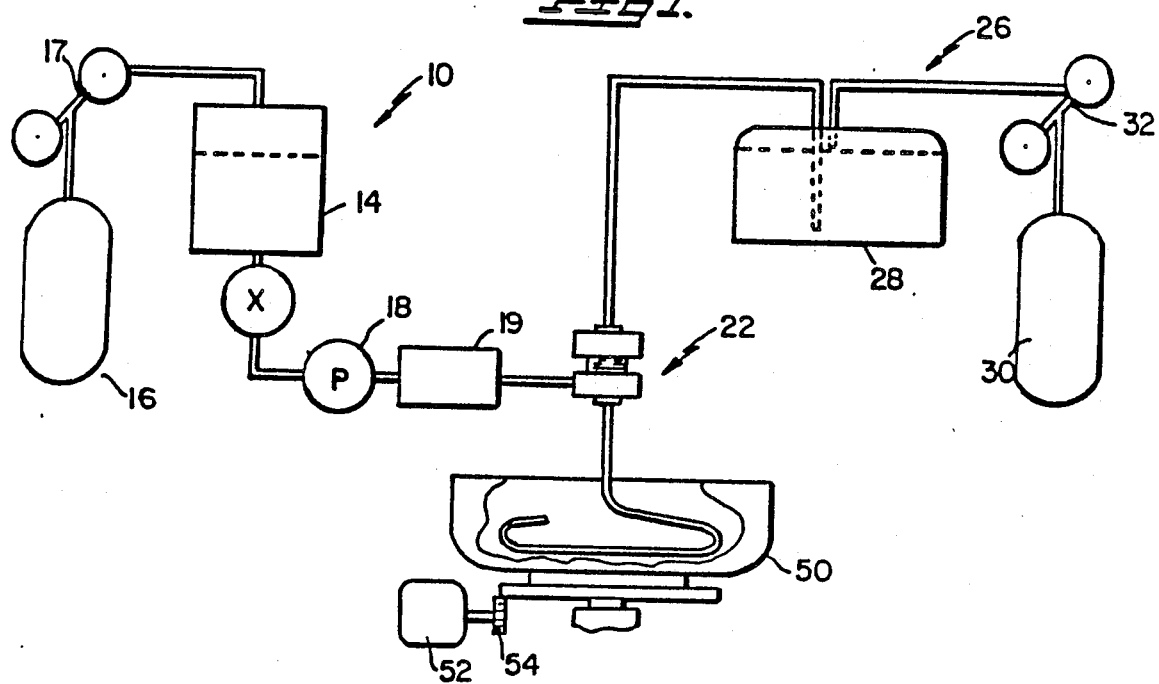
FIG. 1 is a schematic drawing of a typical fiber-spinning apparatus suitable for use in the practice of the present invention.

Referring to FIG. 1, a spinning or casting solution line is shown at the left of the figure and given the general reference numeral 10. Included is a reservoir 14 for holding the spinning or casting solution consisting of a solution of the material which forms the wall of the fiber produced. A tank for holding compressed nitrogen which forces the spinning solution into the spinnerette is shown at 16, a pressure regulator at 17, a metering pump at 18, and a filter at 19. The spinning or casting solution is fed into the side of a spinnerette shown at 22.

The lumen- or bore-forming fluid line is indicated at the right of FIG. 1 and given the reference numeral 26. This line includes a tank 28 for holding the lumen-forming fluid, a nitrogen reservoir 30 which forces the fluid into the top of the spinnerette 22, and a pressure regulator 32.

Figure 2:
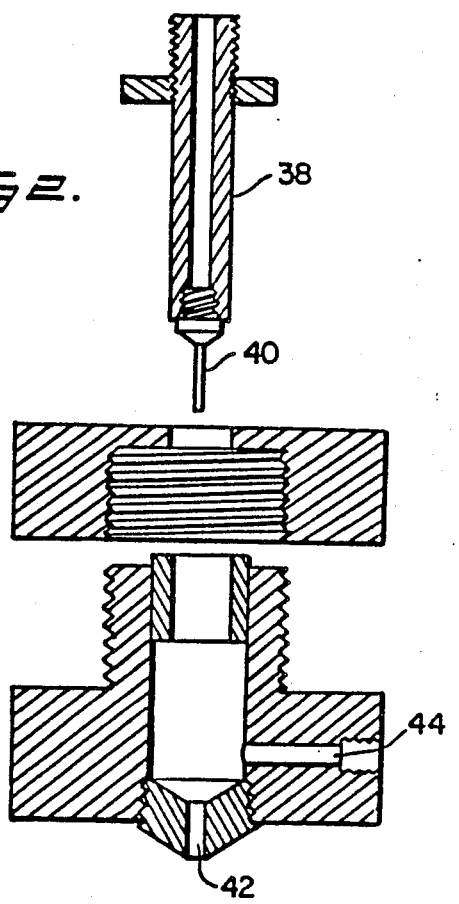
FIG. 2 is a schematic drawing of a typical spinnerette which forms a part of the fiber-spinning apparatus shown in FIG. 1.

Referring to FIG. 2, which illustrates the operating parts of a spinnerette in an exploded view, the lumen-forming fluid, described in detail below, enters the spinnerette through a fitting 38 which terminates at its bottom end in a hollow needle head 40. With the spinnerette assembled, this hollow needle head is positioned within a spinning solution orifice 42. The needle head 40 is located centrally of the orifice 42 and has an outer diameter that is less than the inner diameter of the orifice 42, so that an annular passage is defined between the outside of the needle head 40 and the orifice 42. Spinning or casting solution is introduced to the spinnerette through a bore 44. From this description, it is apparent that with operation of the spinnerette an annular curtain of spinning or casting solution is ejected from the base of the spinnerette, with lumen-forming fluid directed into the interior of this annular curtain.

The lumen-forming fluid tends to promote precipitation of the polymer in the spinning solution with solidification of the polymer, thus forming the lumen wall of the forming fiber. Air and/or water on the outside of the forming fiber precipitates material on the outside of the fiber. The forming fiber, which leaves the spinnerette, falls through an air gap which may range from 0 to 10 cm, preferably less than 2 cm, and collects for a short time in a revolving precipitation bath shown in FIG. 1 at 50. The bath 50 is rotated by a motor 52 and a driving element 54. The bath 50 may contain water, alone or together with solvents such as those used to dissolve the fiber-forming polymer, such solvents being present in any amounts which promote precipitation of the polymer in the spinning solution and solidification of the fiber wall from the outside, as well as leaching of the nonpolymeric liquid pore-forming material. An additional fresh circulating water bath (not shown) is useful for soaking the spun polymeric supports for longer periods of time.

The microporous-walled hollow fiber support of the present invention is preferably composed of polymers of molecular weight of about 10,000 to 100,000 of polysulfone (PS), polyethersulfone (PES) and polyetherimide (PEId), since these materials exhibit satisfactory chemical resistance to components used in preparing the salt-rejecting film, e.g., hexane, amine solutions, acid chlorides, isocyanates, etc. However, other fiber-forming polymers such as polyphenylsulfone, polyimide, and polyvinylidine fluoride are also suitable.

As mentioned above, it has been found that both the compositions of the spinning solution and of the lumen-forming solution used to prepare the support fiber are important for obtaining the desired strength, porosity and absence of elongated voids or fingers adjacent the lumen of the fiber, with resulting optimum performance of the composite membrane. As to the spinning solution, it has been found that the use of a pore-forming material of particular type and amount as a component of the spinning solution results in formation of a finely microporous-walled fiber showing suitable burst pressures and flux rates, as well as good salt rejection.

One class of pore-forming materials employable comprises certain nonpolymeric liquids such as nonpolymeric liquid mono- and dialkyl ethers of ethylene glycol and derivatives thereof, particularly ester derivatives, sometimes referred to as Cellosolve ® solvents, such as ethylene glycol monoethyl ether (Cellosolve ® solvent), ethylene glycol monoethyl ether acetate (Cellosolve ® acetate), ethylene glycol monomethyl ether (methyl Cellosolve ®), ethylene glycol monomethyl ether acetate (methyl Cellosolve ® acetate), ethylene glycol monobutyl ether (butyl Cellosolve ®), ethylene glycol monobutyl ether acetate (butyl Cellosolve ® acetate), ethylene glycol dibutyl ether (dibutyl Cellosolve ®), ethylene glycol monohexyl ether (n-hexyl Cellosolve ®), and the like, or nonpolymeric liquid mono- and dialkyl ethers of diethylene glycol and derivatives thereof, particularly ester derivatives, sometimes referred to as Carbitol ® solvents, such as diethylene glycol monoethyl ether (Carbitol ® solvent), diethylene glycol monoethyl ether acetate (Carbitol ® acetate), diethylene glycol monomethyl ether (methyl Carbitol ®), diethylene glycol monomethyl ether acetate (methyl Carbitol ® acetate), diethylene glycol diethyl ether (diethyl Carbitol ®), diethylene glycol monobutyl ether (butyl Carbitol ®), diethylene glycol monobutyl ether acetate (butyl Carbitol ® acetate), diethylene glycol dibutyl ether (dibutyl Carbitol ®), diethylene glycol monohexyl ether (n-hexyl Carbitol ®), and the like. Mixtures of two or more of such pore-forming materials can also be employed, if desired. Such pore-forming materials will be used in amounts suitably ranging from about 5 to about 30% by weight, and preferably in an amount of about 20% by weight, based on the weight of the fiber-forming polymer in the spinning solution.

Another class of pore-forming materials useful in the present invention comprise lower molecular weight monohydric alcohols containing from 1 to 4 carbon atoms, in amounts from about 5 to about 20% by weight, preferably about 10%. Examples of such pore-formers are methanol, ethanol, N-propanol, isopropanol, N-butanol and 2-butanol. A most preferred alcohol is N-propanol.

Still another excellent pore-former is a minor amount of water, e.g., in the range of 0 to 5 wt%, preferably from about 0.5 to about 4 wt%.

If desired, minor amounts of triazines such as 2,4-diamino-6-phenyl-s-triazine (DPT), e.g., amounts ranging from about 0 to about 2% by weight, and preferably about 1% by weight, based on the weight of the total polymer solution, can also be included to enhance the solubility of the fiber-forming polymer in the solvent or solvent mixture.

An optional water permeability enhancer is a minor amount, e.g., less than 1 wt% of PVP, preferably about 0.25 wt%.

The spinning or casting solution from which the microporous-walled hollow support fiber is spun is prepared by dissolving the fiber-forming polymer and the pore-forming material in a suitable solvent such as dimethyl acetamide (DMAc), dimethyl formamide (DMF), dimethyl sulfoxide (DMSO), 1-methyl-2-pyrrolidinone (MeP), and the like, or mixtures thereof. Optimum concentrations of fiber-forming polymer in the spinning solution may vary considerably with different solvents, nonpolymeric liquid pore-forming materials and the specific properties desired in the support fiber, but amounts of about 18 to about 35% by weight, and preferably about 25 to 27% by weight, generally give good results. Spinning or casting solutions used in preparing the support fibers may generally be used at room temperature (about 25° C.); however, as shown in the examples below, elevated temperatures, such as about 40° to 70° C., and preferably about 50° C., may also be used.

Critical to the formation of a hollow support fiber that possesses sufficient burst strength, water permeability, absence of finger-like voids, and especially proper coatability with a salt-rejecting membrane is a lumen-forming solution with a particular composition. It has been observed that the lumen-forming solution significantly impacts both (1) the important surface characteristics of the lumen or bore of the fiber which bear upon the fiber's satisfactory coatability, and (2) the presence, or more properly, the absence of the previously-mentioned microvoids or "fingers" in the walls of the fibers immediately adjacent the lumen. When proper lumen-forming solutions are used, the surface of the lumen has sufficiently fine porosity (generally on the order of less than 0.01 micron in diameter) to readily accept and firmly adhere to ultrathin salt-rejecting membranes grafted thereupon, while the walls of the fibers are virtually free of any "fingers" close to the lumens or within about the first one-third of the wall's thickness, measuring from the lumen-defining surface radially outwardly. These two features allow the consistent production of hollow support fibers possessing all of the above characteristics desirable in composite membranes useful for reverse osmosis. It has been found that an ideal lumen-forming solution for such purposes comprises an aqueous solution of from about 50 vol % to about 75 vol % polymer solvent such as DMAc, DMF, DMSO, and MeP, preferably from about 60 vol % to about 72 vol %.

As mentioned above, the freshly-spun hollow fiber support falls through either a small air gap or no air gap above a quench or precipitation bath comprising mostly water, although small amounts of surfactants and/or other solvents may be added. Water is preferably continuously supplied to this quench bath. The quench has three functions: it precipitates and coagulates the hollow fiber and it leaches out most of the solvent, salt(s) and pore-forming materials. At the same time, it serves as an extrusion medium, allowing greater than normal drawings of the hollow fibers. In a preferred embodiment, the fibers are subjected to two quenches: the first for a very brief time, e.g., 10 to 20 seconds, the drawings or extrusion taking place at that time, and the second for a relatively long time, e.g., 8 to 12 hours. The second bath or quench is also preferably continuously supplied with nothing but fresh water, thereby accomplishing a complete leach or rinse of virtually all residual solvent, salt(s) and pore-forming materials.

Composite membranes are then prepared by formation of the salt-rejecting film on the inner lumen-defining surface of the microporous-walled hollow fiber support by means of interfacial polymerization. Polymerization reactions of the type disclosed by Cadotte in U.S. Pat. No. 4,039,440, the disclosure of which is incorporated herein by reference, have been found to be very effective in formation of the composite membranes of the invention. These reactions involve interfacial reaction of a surface film of polyethyleneimine (PEI) with a polyfunctional cross-linking reagent such as toluene-2,4-diisocyanate (TDI). The invention is not, however, limited to these reactions, but is applicable generally to reactions which can be adapted to interfacial polymerization, and to formation of films or layers of materials having flux and salt-rejection properties suitable for use in reverse osmosis desalination processes. Another example of such a reaction is the reaction of a surface film of PEI with isophthaloyl chloride (IPC) as disclosed by Riley et al. in *Desalination*, 19, 13 (1976), which disclosure is also incorporated herein by reference.

Procedures employed in formation of the salt-rejecting film on the inner surface of the microporous-walled hollow support fiber are similar to those employed in the above-mentioned prior art disclosures, with modifications suitable for adaptation of the procedures to the use of the hollow fiber supports of the invention. For example, when the film is to be formed by reaction between PEI and IPC or TDI, an aqueous solution of PEI may simply be drawn up into the interior of the fiber using a slight vacuum. After a period sufficient for adsorption of PEI solution on the inner surface of the fiber, usually about 30 to 90 seconds, unadsorbed solution is drained from the fiber, and a solution of IPC or TDI in a water-immiscible organic solvent is drawn up into the fiber lumen and drained after another period of approximately 30 to 90 seconds. The fibers are then heated at a temperature of about 100° to 120° for about 15 to 60 minutes to cure the resulting film of interfacial polymer. Optimum periods for adsorption of reactant solutions, for the polymerization reaction and for curing the resulting film will, of course, vary widely depending on the specific composition of the film, the specific type of support fiber, thickness of the film, intended use of the composite membrane, etc., and are best determined empirically. Suitable concentrations of PEI in the aqueous solution will generally range from about 0.5 to 10 wt %, with the molecular weight of the PEI being about 500 to 10,000. Concentrations of the IPC and TDI in the organic solvent will usually range from about 0.1 vol % to 5.0 vol %.

The composite membranes of the invention may be employed in reverse osmosis processes for desalination of either sea water or brackish water. In such a process, the saline feed solution is pumped through the lumens of the composite membrane under a pressure in excess of the osmotic pressure of the feed solution, with product water diffusing through the membrane and being collected on the outer, or shell, side of the membrane.

In order that those skilled in the art can more fully understand the present invention, the following examples are set forth. These examples are given solely for purposes of illustration, and should not be considered as expressing limitations unless so set forth in the appended claims. All percentages are by weight unless otherwise stated.

Example I

Microporous-walled hollow support fibers were prepared at 30° C. from the casting solutions listed in Table I below, using an apparatus as shown in FIG. 1, by pressurizing the casting solution, contained in the reservoir 14, to 10 psig with compressed nitrogen gas from the tank 16 through the pressure regulator 17, forcing the casting solution through the metering pump 18 at a flow rate of 1.5 cc/minute, then through the filter 19 to the side of the spinnerette 22. An aqueous lumen-forming solution made up as indicated in Table I was fed simultaneously from the tank 28 by way of the fluid line 26 into the top of the spinnerette 22, this solution being forced through the fluid line 26 by nitrogen gas from the reservoir 30 at a pressure of 10 psig, this pressure being regulated by the pressure regulator 32.

The spinnerette used was of the type shown in FIG. 2, with an inner needle diameter of 550 mm and an outer orifice diameter of 1300 mm. The tip of the spinnerette was 12 mm above the precipitation bath 50 (5 mm for Run No. 9), which contained fresh water at 30° C. (22° C. for Run No. 9). The precipitated fibers had an average dwell time of 15 seconds in the precipitation bath 50 and, contemporaneously with precipitation, were drawn up on a take-up reel (not shown in FIG. 2), then deposited in a second fresh water bath (also not shown in FIG. 2), with a continuous fresh water rinse for 10–12 hours at 30° C.

Scanning electron micrograph studies of the hollow fiber supports so prepared showed all such fibers to have a highly dense, finely porous (pores less than 0.01 micron in diameter) lumen surface and a microporous wall which had no finger-like voids in the area comprising the first one-third to one-half of the wall's thickness, measuring from the lumen-defining surface radially outwardly, many of the fibers being totally devoid of such "fingers."

A salt-rejecting membrane or film was formed on the inner or lumen surfaces of the thus-prepared microporous-walled hollow support fibers by first drawing an aqueous 4% polyethyleneimine solution into the fiber lumens for one minute. The polyethyleneimine solution was then displaced by forcing a second solution, containing 0.25% by weight of toluene-2,4-diisocyanate in hexane through the fiber lumens (0.50 wt % for Run No. 9). After 30 seconds contact time, residual toluene-2,4-diisocyanate hexane solution was removed with compressed nitrogen gas. The fibers were then heat-cured in a 100° C. oven for 15 minutes (30 minutes for Run No. 9), with circulating hot air being forced through the fiber lumens during this time.

Burst strength by internal pressurization was determined by selecting a representative hollow fiber, forming a loop with this fiber by connecting both ends to a common fitting on a static hydraulic water pressure valve, and then pressurizing the inside of the fiber at a rate which increased about 10 psi per second until the fiber actually burst.

Wall thicknesses of the composite hollow fibers were generally one-half the difference between the outside diameter and the inside diameter.

In Table I the following abbreviations are used:
PS = polysulfone, 30,000 average molecular weight
PES = polyethersulfone, 22,400–26,000 average molecular weight
PEId = polyetherimide, 37,000–39,000 average molecular weight
MeC = methyl Cellosolve ® (ethylene glycol monomethyl ether)
PVP = polyvinylpyrrolidone
DMAc = dimethylacetamide
MeP = 1-methyl-2-pyrrolidinone
DPT = 2,4-diamino-6-phenyl-s-triazine
NPr = N-propanol

TABLE III

| Fiber of Run No. | Pressure (psi) | Flux (gfd) | Salt Rejection (%) |
|---|---|---|---|
| 1 | 400 | 7.8 | 96.5 |
| 2 | 400 | 12.9 | 99.14 |
| 3 | 800 | 27.5 | 99.20 |
| 4 | 800 | 18.1 | 98.2 |
| 5 | 800 | 18.6 | 95.8 |
| 6 | 800 | 8.8 | 95.8 |
| 9 | 400 | 10.5 | 98.9 |

As is apparent from the results shown in Tables II and III, the composite reverse osmosis membranes of the present invention have outstanding performance characteristics in terms of water premeability and rejection under high pressure conditions.

The above discussion and related illustrations of the present invention are directed primarily to preferred embodiments and practices thereof. It will be readily apparent to those skilled in the art, however, that numerous changes and modifications in the actual implementation of the concepts described herein can readily be made. Thus, it is contemplated that such changes may be made without departing from the spirit and scope of the invention as defined by the following claims.

TABLE I

| Run No. | wt % Casting Solution Components | | | | | | Vol % DMAc Lumen-Forming Solution | Inside Diameter (μm) | Outside Diameter (μm) | Burst Strength (psi) |
|---|---|---|---|---|---|---|---|---|---|---|
| | Polymer | DMAc | MeC | PVP | DPT | H$_2$O | NPr | | | | |
| 1 | 27 PS | 52 | 20 | 0 | 1 | 0 | 0 | 72 | 275 | 700 | 940 |
| 2 | 27 PS | 51.25 | 20 | 0.25 | 1 | 0.5 | 0 | 72 | 270 | 620 | 750 |
| 3 | 30 PES | 45 | 20 | 0 | 1 | 4 | 0 | 50 | 310 | 730 | 870 |
| 4 | 30 PES | 45 | 20 | 0 | 1 | 4 | 0 | 50 | 280 | 680 | 1060 |
| 5 | 25 PEId | 39* | 10 | 0 | 0 | 0 | 0 | 75 | 240 | 565 | 970 |
| 6 | 25 PEId | 0** | 20 | 0 | 0 | 0 | 0 | 50 MeP | 295 | 635 | 1140 |
| 7 | 27 PES | 47.75 | 20 | 0.25 | 1 | 4 | 0 | 54.5 | 335 | 660 | 820 |
| 8 | 27 PES | 47.75 | 20 | 0.25 | 1 | 4 | 0 | 62 | 320 | 730 | 900 |
| 9 | 27 PES | 57.25 | 0 | 0.25 | 1 | 4.5 | 10 | 62 | 130 | 300 | 710 |

*Plus 26 wt % MeP as solvent.
**55 wt % MeP as solvent.

Example II

The polyethyleneimine-toluene-2,4-diisocyanate copolymer-coated microporous-walled hollow support fibers of Runs Nos. 2, 5 and 9 from Example I above were used in reverse osmosis purification of a 5000 ppm magnesium sulfate feed solution introduced into the lumens of the fibers at the pressures noted in Table II below. The water fluxes and salt rejections exhibited by these fibers are also given in Table II.

TABLE II

| Fiber of Run No. | Pressure (psi) | Flux (gfd) | Salt Rejection (%) |
|---|---|---|---|
| 2 | 400 | 15.2 | 99.96 |
| 5 | 800 | 15.4 | 99.50 |
| 9 | 400 | 11.4 | 99.93 |

Example III

The polyethyleneimine-toluene-2,4-diisocyanate copolymer-coated microporous-walled hollow support fibers of Runs Nos. 1–6 and 9 from Example I above were used in reverse osmosis purification of a 5000 ppm sodium chloride feed solution introduced into the lumens of the fibers at the pressures noted in Table III below. The water fluxes and salt rejections exhibited by these fibers are also given in Table III.

What is claimed is:

1. A method for making a reverse osmosis lumen-side feed composite membrane comprising the steps of:
   (a) forming a microporous-walled hollow fiber support with fiber walls that are microporous and substantially completely free of voids greater than about 5 microns in the area of the wall adjacent the lumen of said hollow fiber support by coaxially spin casting (1) a solution of a fiber-forming polymer selected from the group consisting of polysulfone, polyethersulfones, polyphenylsulfones, polyvinylidenefluorides, polyimides, and polyetherimides in an organic solvent, said fiber-forming polymer solution containing a nonpolymeric liquid pore-forming material selected from the group consisting essentially of water, monohydric alcohols containing from 1 to 4 carbon atoms, and mono-and dialkyl ethers of ethylene glycol, diethylene glycol and esters thereof, with (2) a lumen-forming fluid comprising from about 50 to about 75 vol % organic solvent in water; and
   (b) forming, by interfacial polymerization, a salt-rejecting semipermeable film on the inner lumen-defining surface of said microporous-walled hollow fiber support.

2. The method of claim 1 wherein said organic solvent for said fiber-forming polymer and for said lumen-forming fluid is selected from the group consisting of dimethyl acetamide, dimethyl formamide, dimethyl sulfoxide and 1-methyl-2-pyrrolidinone.

3. The method of claim 1 wherein said pore-forming material is water in a concentration of from about 0.5 to about 5 wt %.

4. The method of claim 1 wherein said pore-forming material is ethylene glycol monomethyl ether in a concentration of from about 5 to about 30 wt %.

5. The method of claim 1 wherein said pore-forming material is a monohydric alcohol containing from 1 to 4 carbon atoms in a concentration of from about 5 to about 20 wt %.

6. The method of claim 1 wherein the concentration of said fiber-forming polymer in said solution is from about 18 to about 35 wt %.

7. The method of claim 4 wherein the concentration of said pore-forming material is about 20 wt % and said fiber-forming solution additionally contains about 1 wt % 2,4-diamino-6-phenyl-s-triazine and about 0.25 wt % polyvinylpyrrolidone.

8. The method of claim 5 wherein the concentration of said pore-forming material is about 10 wt % and said fiber-forming solution additionally contains about 1 wt % 2,4-diamino-6-phenyl-s-triazine and about 0.25 wt % polyvinylpyrrolidone.

9. The method of claim 4 wherein said fiber-forming polymer is polyetherimide and the concentration of said pore-forming material is about 10 wt %.

10. The method of claim 1 wherein said solution of fiber-forming polymer comprises about 27 wt % polysulfone in an organic solvent of dimethylacetamide containing about 20 wt % ethylene glycol monomethyl ether, about 1 wt % 2,4-diamino-6-phenyl-s-triazine, about 0.25 wt % water, and said lumen-forming fluid comprises about 72 vol % dimethyl acetamide in water.

11. The method of claim 1 wherein said solution of fiber-forming polymer comprises about 27 wt % polysulfone in an organic solvent of dimethylacetamide containing about 10 wt % N-propanol, 1 wt % 2,4-diamino6-phenyl-s-triazine, about 4.5 wt % water, and said lumen-forming fluid comprises about 62 vol % dimethyl acetamide in water.

12. The product of the method of claim 1, 10, or 11.

13. The method of claim 1 wherein said salt-rejecting semipermeable film is formed by the steps of:

(a) forming a film of an aqueous solution of polyethyleneimine on the inner lumen-defining surface of said microporous-walled hollow fiber support;

(b) contacting said film with a solution of a polyfunctional cross-linking reagent in a nonpolar organic solvent; and (c) heat curing to complete reaction between said polyethyleneimine and said cross-linking reagent.

14. The method of claim 13 wherein said cross-linking reagent is toluene diisocyanate.

15. The method of claim 13 wherein said cross-linking reagent is isophthaloyl chloride.

16. The product of the method of claim 13.

17. A composite hollow fiber membrane useful in reverse osmosis carried out by lumen-side feed comprising:

(a) a microporous-walled hollow fiber support cast from a solution of a fiber-forming first polymer selected from the group consisting of polyethersulfones, polyphenylsulfones, polyvinylidenefluorides, polyimides and polyetherimides containing a nonpolymeric liquid pore-forming material selected from the group consisting essentially of water, monohydric alcohols containing from 1 to 4 carbon atoms, and mono- and dialkyl ethers of ethylene glycol, diethylene glycol and esters thereof, the walls of said support being substantially completely free of voids in excess of about 5 microns in the area of the wall adjacent the lumen of said hollow fiber support; and (b) a salt-rejecting semipermeable film of a second, different polymer on the inner lumen-defining surface of said support, said film being formed by interfacial polymerization.

18. The membrane of claim 17 wherein the inner lumen-defining surface of said support has pores of less than 0.01 micron in diameter and said salt-rejecting semipermeable film has a thickness of from about 0.1 to 2.0 microns.

19. The membrane of claim 14 wherein said salt-rejecting semipermeable film is a copolymer of polyethyleneimine and toluene diisocyanate.

20. The membrane of claim 14 wherein said salt-rejecting semipermeable film is a copolymer of polyethyleneimine and isophthaloyl chloride.

* * * * *

UNITED STATES PATENT AND TRADEMARK OFFICE
CERTIFICATE OF CORRECTION

PATENT NO. : 4,772,391

DATED : September 20, 1988

INVENTOR(S) : Richard W. Baker et al.

It is certified that error appears in the above-identified patent and that said Letters Patent is hereby corrected as shown below:

| | |
|---|---|
| In the Abstract, Line 13 | Change "70" to --75--. |
| Col. 2, Line 56 | Change "salt-rejeting" to --salt-rejecting--. |
| Col. 7, Line 57 | Insert --C-- after 100° and after 120°. |
| Col. 11, Lines 40-41 | Change "2,4-diamino6-phenyl-s-triazine" to --2,4-diamino-6-phenyl-s-triazine--. |

Signed and Sealed this

Twenty-seventh Day of February, 1990

Attest:

JEFFREY M. SAMUELS

*Attesting Officer*     *Acting Commissioner of Patents and Trademarks*